United States Patent [19]
Decramer et al.

[11] 3,899,674
[45] Aug. 12, 1975

[54] CRYOGENIC RADIATORS FOR RADIOMETERS, AND MORE PARTICULARLY FOR SATELLITE-SUPPORTED RADIOMETERS

[75] Inventors: Lionel Decramer, Lasbordes-Balma; Philippe Mauroy, Saint-Orens, both of France

[73] Assignee: Centre National d'Etudes Spatiales, Paris, France

[22] Filed: Mar. 21, 1974

[21] Appl. No.: 453,339

[30] Foreign Application Priority Data
July 13, 1973 France .............................. 73.25754

[52] U.S. Cl. ................................. 250/352; 250/338
[51] Int. Cl.² ........................................... G01J 1/00
[58] Field of Search ............................ 250/338, 352

[56] References Cited
UNITED STATES PATENTS

| | | | |
|---|---|---|---|
| 3,274,387 | 9/1966 | Putley | 250/352 |
| 3,435,137 | 3/1969 | Altshuler et al. | 250/352 X |
| 3,601,611 | 8/1971 | Kendall, Sr. | 250/352 |

*Primary Examiner*—Archie R. Borchelt
*Attorney, Agent, or Firm*—Wigman & Cohen

[57] ABSTRACT

Structure of revolution for protecting and supporting a cryogenic radiator in a satellite. This structure includes two frusto-conical screens arranged practically one above the other and joined by an intermediate flange. The upper screen acts as a sunshade in respect of solar radiation, whereas the lower screen facilitates self-radiation of the cryogenic radiator and protects it from the environment.

15 Claims, 2 Drawing Figures

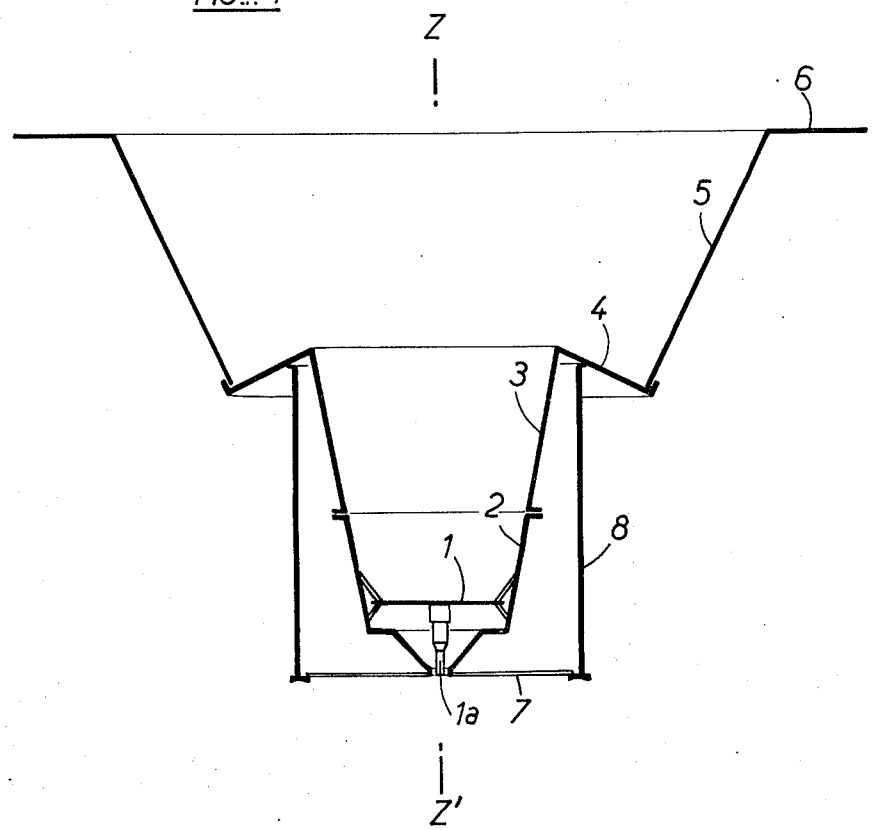
FIG.: 1

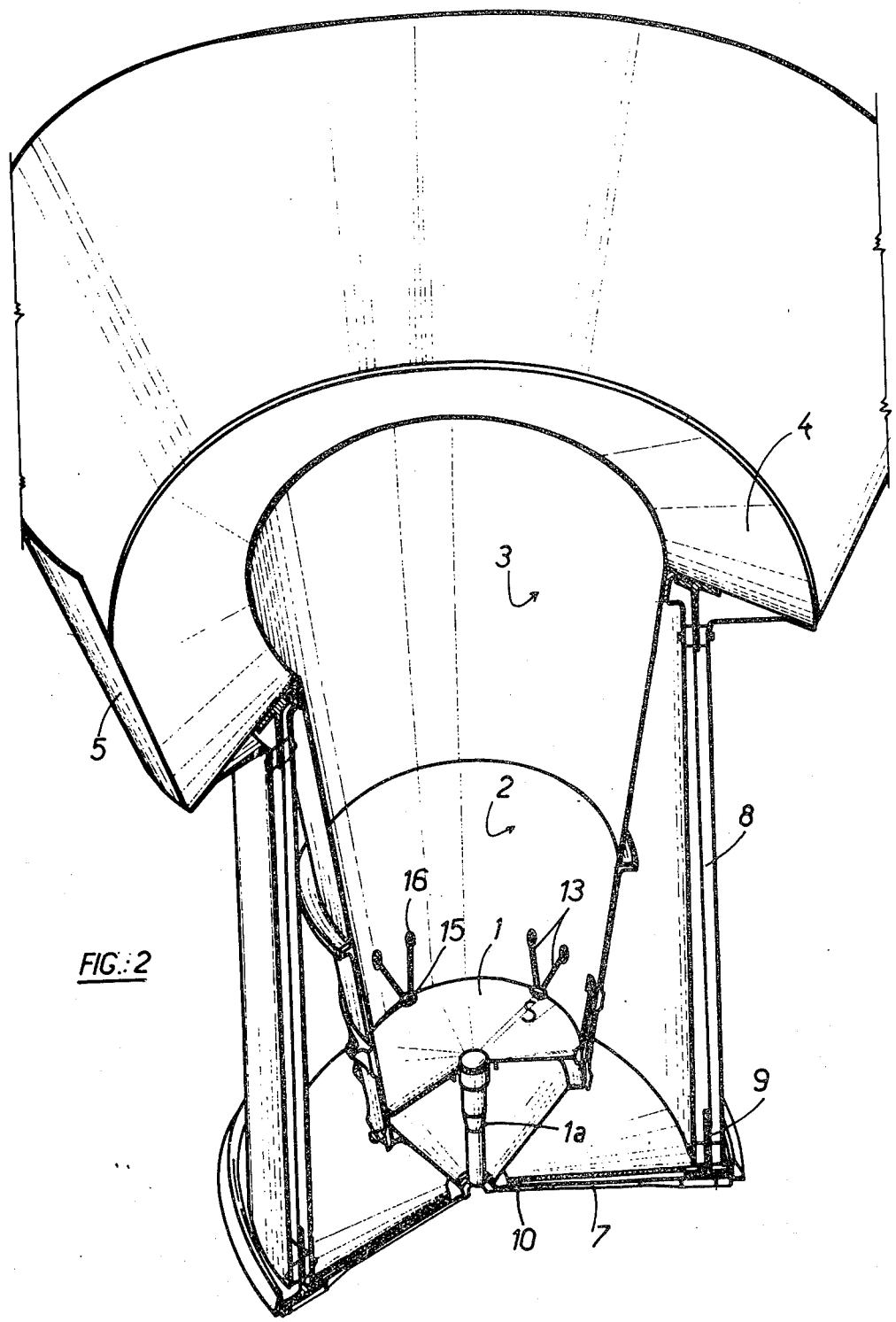
FIG.: 2

CRYOGENIC RADIATORS FOR RADIOMETERS, AND MORE PARTICULARLY FOR SATELLITE-SUPPORTED RADIOMETERS

This invention relates primarily to the cooling of a radiation detector to cryogenic temperatures and more particularly to the manner of devising a structure of revolution for protecting and mounting a radiometer platform, most notably in the case of a radiometer platform designed to be suspended in vacuo from such a structure, a bottom opening in which is directed towards a source whose radiation is to be studied, said structure being supported by a satellite or other device. This is a passive system strongly coupled to a cold source at 4°K constituted by space at high altitude.

In effect, a supporting and protecting structure according to this invention, that surrounds the radiometer platform to that end, forms with the platform a cooling system operating by radiation, or "cryogenic radiator", which in this case is used to maintain a radiation detector which is in heat conducting relationship with the platform at its optimum cryogenic operating temperature (80°K), whereby to form a radiometer capable of measuring the radiation from a source by focusing it on the detector positioned at the centre of the radiometer platform.

Such structure must be devised so as to be able to evacuate the thermal energy dissipated by the detectors during measurement of the radiation and the thermal fluxes conducted through the wires for energizing such detectors, and so as to reflect as much as possible of external fluxes from the sun or planets liable to reach the platform, and also in order to minimize internal fluxes from the satellite or the radiometer that are liable to reach the radiator and are at substantially the environmental temperature.

Now it is already known, according to French Pat. No. 1,338,881 and its certificate of addition No. 82,838 filed by Felix Trombe, to devise radiators which employ the radiation into space from bodies of nature and configuration appropriate to the obtainment of large temperature drops, which in practice is tantamount to designing what is substantially a "black body." In such cases, the emission of energy from the black body, if the same receives no energy - notably by radiation - takes place at the expense of its own reserve of heat. In theory, therefore, it should ultimately reach the region of absolute zero after a length of time which depends on its calorific capacity. Such conditions can be achieved in space when the radiating surfaces are sheltered from solar radiation or from the radiation from stars or planets of non-negligible apparent diameter.

A device according to said French patent and its certificate of addition accordingly includes basically:

a. a flat or curved radiating body, possessing substantially the characteristics of a black body in respect of the infrared radiation which it emits and behaving like a reflecting body in respect of solar radiation;

b. partially enveloping said body, a surface the inside face of which has high reflecting power in respect of the infrared radiation from said body and solar radiation, and the outside face of which is covered with suitable heat insulating material, the shape and position of said surface being such as to prevent direct radiation from the sun and terrestrial objects from reaching said black body yet allow the same to radiate within a maximum solid angle; said surface may have an interior coating of non-oxidized aluminium, for example, and may have any convenient geometrical shape to match that of the emitting black body, examples being a cone frustum or a pyramid frustum.

The purpose of such reflecting surface is to:

protect the black body from direct radiation (infrared radiation from terrestrial objects and direct solar radiation during daytime periods;

to preserve the ability of the black body to radiate within a maximum solid angle by virtue of the infrared reflecting capacity of said surface; and to protect the radiating black body thermally from the external environment.

The importance of the geometrical nature of the protecting and supporting structure having such a reflecting surface, in order to obtain the greatest possible solid angle and protection in respect of direct disrupting radiation, emerges clearly from FIG. 4 in said certificate of addition. This figure depicts a structure substantially of revolution about an axis, for protecting and supporting a radiator required to behave substantially as a black body in respect of infrared radiation and as a reflector in respect of solar radiation, said structure including at least two coaxial frusto-conical screens acting as radiant stages, opening outwardly and surrounding said radiator, these screens being heat-insulated externally, having a high reflecting capacity on their inside faces in respect of infrared radiation and serving as a shield against direct radiation from the sun and other bodies reaching it at certain angles of incidence.

It is to be noted, however, that the device according to said patent or its certificate of addition notably involves, for the indicated application, the production of ice and that it must operate at near-normal pressures, hence at temperatures in the region of 273°K. It thefore undergoes heat transfers by convection and gaseous conduction, whereas the present invention is concerned with operation in vacuo (hence without heat transfers by conduction or gaseous convection) in order to reach cryogenic temperatures of the order of 80°K.

The present invention relates to an improvement to the subject device of said patent or addition, whereby to adapt the same for the greatest possible effectiveness in cooling, a radiometer detector under the conditions prevailing in interstellar space, i.e. by radiant coupling with space at 4°K.

Accordingly, in a structure of the kind hereinbefore described with reference to FIG. 4 of said certificate of addition, the cryogenic radiator being a radiometer platform designed to operate in a satellite in space at a cryogenic temperature of the order of 80°K, one of the two screens, which is wider than the other, is placed above the other screen for almost its full length in the direction of divergence of the screens and in such manner that the facing surfaces of said two screens correspond only to a small portion of said height, the upper screen acting primarily as a sunshade for the radiator in respect of direct solar radiation and at the same time reflecting back into space most of the other external fluxes, whereas the lower screen facilitates the radiator's own radiation into space and protects the radiator from the sunshade's own infrared radiation and from solar radiation possibly diffused by the sunshade.

The description which follows with reference to the accompanying non-limitative exemplary drawings will give a clear understanding of how the invention can be carried into practice.

IN THE DRAWINGS

FIG. 1 shows in approximately schematic section the protective and supporting structure for a radiometer platform; and FIG. 2 is a perspective portrayal, in open and cutaway fashion, of the structure in greater detail, showing the manner of its assembly and details of attachment to the radiometer platform.

Reference to FIG. 1 shows how the radiometer radiator according to the invention is mounted:

Reference numeral 1 designates the cooled platform formed by a light-alloy disc 85 mm in diameter. In one embodiment, the platform carries on its upper face a honeycomb cellular structure and the interior of these cells is coated with a black paint. Each cell behaves like a black body ($\epsilon \geq 0.97$) with respect to space, thereby improving the coupling with space at 4°K.

In an alternative version, the platform receives on its upper face a cold lining, i.e. one having high infrared emissivity ($\epsilon \geq 0.87$) and a good solar reflection coefficient ($k \geq 0.83$), such as a white point. In both versions the lower face of the platform is polished and aluminized ($\epsilon \leq 0.04$).

Reference numeral 2 designates a first screen (hereinafter referred to as the "housing") formed by a cone frustum with an apex half-angle of 11°30'. Its height, which is tied to the difficulties encountered in polishing surfaces and depositing aluminium in vacuo for specular polish on the inside surface, is fixed at 100 mm, with an upper orifice of diameter equal to 121.4 mm. The lower face of the platform is suspended 22.8 mm above the lower opening of housing 2. The bottom of the housing is designed to protect the platform against radiation from inside the radiometer.

Reference numeral 3 designates the reflecting cone, which has an upper orifice diameter of 164.14 mm, an apex half-angle of 11°30' and a height of 105 mm, extends the housing 2 and is attached to it. Likewise, the specularly polished reflecting cone receives a deposit of aluminium in vacuo on its inside surface, whereas its outside surface is polished with a buff. (The assembly 2–3 forms a whole and is split into two parts 2 and 3 which are then mutually united. This is due to difficulties encountered in working the surfaces and makes it easier to fit the radiometer platform with all the precision required).

Reference numeral 4 designates a flange attached to the reflecting cone, shaped as a cone frustum with an apex half-angle of 65°, called the intermediate stage. Since the aforesaid upper orifice has a diameter of 164.14 mm, the outer base circle diameter of the flange is 283.7 mm. The external face of the flange is covered with white paint ($\epsilon \geq 0.87$) and its inside face is polished with a buff. The function of this intermediate stage, which is heat conductingly connected to stages 2 and 3, is to increase the radiant power of cone 2 and 3 by its own surface, which has a strongly emissive coating.

Reference numeral 5 designates a second screen (hereinafter referred to as the "sunshade"), formed by a cone frustum with an apex half-angle of 25°, an orifice diameter of 433.3 mm, and a base diameter of 283.7 mm. Its inside surface is specularly polished and receives a deposit of aluminium in vacuo thereon ($\epsilon \leq 0.04$).

Its external face is provided with a high-emissivity cold coating if it is exposed to space, but if it is disposed within the satellite structure it is polished with a buff in order to have low emissivity. Preferably, the upper screen is provided at its upper end with a circular rim or flange 6 (not shown in FIG. 2) the plane of which is normal to said axis and directed towards the exterior of the cone, the latter being provided on its upper external face with a solar energy reflecting cold coating whereby to lower the temperature of the sunshade.

It will be appreciated from the foregoing that the dimensions and position of the second screen 5 are chosen so as to reflect towards the exterior of the cone any radiation from an outside source (solar or infrared) arriving at an incidence angle in excess of 65° with respect to the structure axis Z–Z'.

Should the screen 5 not have its external face exposed to space, it has added to its upper end an externally extending circular rim or flange 6 the plane of which is normal to said axis, said flange being provided on its upper external face with a strongly emissive coating in order to lower the temperature of the sunshade, an example being a white paint or an optical surface reflector (OSR).

Since the flux density radiated by the radiator (a black plate at 80°K) is only 0.2 mW/cm$^2$, it is essential to decouple it conductively and radiantly from all hot parts. Such decoupling creates a longitudinal thermal gradient between the sunshade orifice and the bottom of the radiator and is obtained:

by separating sunshade 5 from the remainder of the radiator structure;

by isolating the radiator from the radiometer structure, in a first embodiment by means of an insulated shell 8 (FIG. 2) for the conductive flux, and in a second embodiment by a suspension system of the kind described in French patent application No. 73 16 106 (not shown in the drawing), comprising insulating tension-ties connected to the satellite structure and to assembly 2–3–4 in respect of the conductive flux; ; in both these embodiments, multilayer insulation of the kind shown at 10 is provided on base 7 in order to decouple the radiant fluxes originating from the radiometer or the satellite; and by uniting the cooled radiator platform with the reflecting cone (the lower screen) by means of very slightly conducting interconnecting members or tension ties.

The dimensions are chosen so that the radiator platform cannot "see" the sunshade either directly or after reflection off the cone 2–3. Thus any radiation from the sunshade — whether it be thermal radiation or diffuse solar radiation — will for all practical purposes never reach the platform. This is all the more necessary in that it is technologically impossible to have a perfectly specular solar reflector and in that a non-negligible fraction of the solar flux is rediffused towards the cold parts.

Between sunshade 5 and intermediate stage 4, which are set substantially at right angles to each other, a gap is provided as shown in FIGS. 1 and 2 in order to avoid coupling by conduction between 4 and 5 and in order to prevent possible vibration of the one from being transmitted to the other. The sunshade is fixed to the satellite structure or to the radiometer support integrated into the satellite.

The radiator and its detector are rigidly connected to the radiometer. Lower screen 2–3 is supported on base 7 through the agency of poorly conducting mechanical ties which possibly include a titanium shell 8 and noryl frames 9.

Reference to FIG. 2 shows the radiometer platform 1 suspended inside the conical enclosure 2 which terminates in a lower dishlike portion parallel to the platform. The heat conducting central tube 1a is fast with platform 1 and contains the focusing system and the measuring infrared detectors at a temperature of 80°K. Platform 1 is connected and fixed to support 2 by sets of tension-wires (or strips) 13 which form so many "pyramids", substantially at least, that is to say that two wires 13 are provided on either side of the platform, each attached to a pin 15 provided on the platform and to an attachment member (or tensioning member) 16 on the cone, which wires or strips converge towards an imaginary apex S. This attachment system is described in the aforesaid patent application No. 73 16 106.

For the application envisaged in particular herein, the radiometer platform must be positioned with extreme precision.

It goes without saying that changes and substitutions of parts may be made in the exemplary embodiment hereinbefore described, without departing from the scope of the invention as set forth in the appended claims.

We claim:

1. A structure substantially of revolution about an axis, including upper and lower outwardly open frustoconical coaxial screens functioning as radiant stages, said screens being thermally insulated toward the exterior, having high reflecting capacity on their interior faces with respect to infrared radiation and arranged to reflect radiation from the sun and other bodies arriving at incidence angles in excess of 65° with respect to said axis, a cryogenic radiator which behaves substantially as a black body with respect to infrared radiation and as a reflector with respect to solar radiation, said radiator including a radiometer platform fitted on board a satellite in space at a cryogenic temperature of approximately 80°K and means for supporting said radiator within said screens, the upper one of said screens being wider than and positioned above the other screen over virtually its entire height in the direction of divergence of the screens, the mutually facing surfaces thereof corresponding to only a small fraction of said height, the upper screen functioning primarily as a sunshade for said radiation with respect to direct solar radiation and reflecting back into space the greater part of the other external fluxes, the lower screen facilitating radiation from the radiator into space and protecting said radiator against infrared radiation from said upper screen and against possible solar radiation diffused thereby.

2. A structure as claimed in claim 1, wherein the interior face of the upper screen is specularly polished and covered with a deposit of aluminium in vacuo, the external face thereof being covered with a powerfully emissive solar energyreflecting coating.

3. A structure as claimed in claim 1, wherein the interior face of the upper screen is specularlypolished and covered with a deposit of aluminium in vacuo, the exterior face thereof being buff-polished for low emissivity.

4. A structure as claimed in claim 1, wherein the upper screen is provided at its upper end with an external circular rim disposed in a plane normal to said axis and having on its upper face a solar energy-reflecting strongly emissive cold coating to form an optical surface reflector.

5. A structure as claimed in claim 1, wherein the upper screen includes at its lower end a rim forming an intermediate screen between the lower screen and the upper screen and forming with the lower screen an acute angle and with the upper screen substantially a right angle.

6. A structure as claimed in claim 5, wherein the internal face of the intermediate screen is buff-polished, the external face thereof having a strongly emissive solar energy-reflecting coating.

7. A structure as claimed in claim 1, wherein the interior face of the lower screen is specularly polished and covered with aluminium deposited thereon in vacuo, the exterior face thereof being buff-polished.

8. A structure as claimed in claim 5, including a poor heat-conducting insulating shell and wherein the assembly formed by the intermediate screen and the lower screen is fixed to the satellite structure through said insulating shell.

9. A structure as claimed in claim 5, including a suspension system utilizing insulating tension ties for connecting the assembly formed by the intermediate screen and the lower screen to the radiometer platform.

10. A structure as claimed in claim 5, including means for mechanically connecting the upper screen to the satellite structure while thermally decoupling it with respect to the assembly formed by the intermediate screen and the lower screen connected to the radiometer platform.

11. A structure as calimed in claim 1, wherein the radiometer platform includes a light-alloy disk the upper face of which is formed by a honeycomb cellular structure, the interior of the cells thereof being coated with a black paint and the lower face of the platform being polished and aluminized.

12. A structure as claimed in claim 1, wherein the radiometer platform is a light alloy disk the upper face of which is covered with a cold coating of the white paint type and the lower face of which is polished and aluminized.

13. A structure as claimed in claim 2, wherein said solar energy-reflecting coating is white paint.

14. A structure as claimed in claim 4, wherein said optical surface reflector is white paint.

15. A structure as claimed in claim 6, wherein said solar energy-reflecting coating is white paint.

* * * * *